US012769478B2

(12) United States Patent
Na et al.

(10) Patent No.: US 12,769,478 B2
(45) Date of Patent: Oct. 20, 2026

(54) HOST DEVICE, STORAGE DEVICE AND OPERATING METHOD OF THE STORAGE DEVICE

(71) Applicant: SAMSUNG ELECTRONICS CO., LTD., Suwon-si (KR)

(72) Inventors: Jong Sung Na, Suwon-si (KR); Se Hee Lee, Suwon-si (KR); Seon A Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

(21) Appl. No.: 19/092,508

(22) Filed: Mar. 27, 2025

(65) Prior Publication Data

US 2025/0315185 A1 Oct. 9, 2025

(30) Foreign Application Priority Data

Apr. 9, 2024 (KR) ........................ 10-2024-0048314

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0604; G06F 3/0655; G06F 3/0679; G06F 13/1668; G06F 2212/1016; G06F 2212/1032; G06F 3/0614; G06F 3/0658; G06F 3/0659; G06F 21/6218; G06F 21/629; G06F 11/1471; G06F 11/3476; G06F 2201/86
See application file for complete search history.

(56) References Cited

U.S. PATENT DOCUMENTS 9,953,068 B1 * 4/2018 Taboriskiy ............ G06F 16/252
2016/0085792 A1 * 3/2016 Dukes ................. G06F 16/2272 707/692
2018/0074973 A1 * 3/2018 Chan ....................... G06F 11/00
2018/0113783 A1 * 4/2018 Luo ....................... G06F 11/323
2018/0293253 A1 * 10/2018 Oravivattanakul .......................... G06F 11/0787
2019/0007284 A1 1/2019 Doshi et al.
2021/0342205 A1 11/2021 Mcguinness et al.
(Continued)

FOREIGN PATENT DOCUMENTS

CN 116483795 A * 7/2023 ......... G06F 16/1815

*Primary Examiner* — Jane W Benner
(74) *Attorney, Agent, or Firm* — Sughrue Mion, PLLC

(57) ABSTRACT

A host device and a storage device are provided. A host device includes a controller configured to process log data related to a state of a first storage device by using first spec data, the first spec data including parsing information for each log page identifier; and a communication circuit, wherein the controller is further configured to: transmit a first request for requesting the first spec data to the first storage device through the communication circuit; receive the first spec data from the first storage device through the communication circuit in response to the first request; transmit a second request for requesting first log data to the first storage device through the communication circuit; and receive the first log data from the first storage device through the communication circuit in response to the second request and process the received first log data by using the first spec data.

20 Claims, 9 Drawing Sheets

(56) References Cited

U.S. PATENT DOCUMENTS

| | | | |
|---|---|---|---|
| 2021/0405911 | A1 | 12/2021 | Navon et al. |
| 2022/0404999 | A1 | 12/2022 | Rajagopalan et al. |
| 2023/0069623 | A1* | 3/2023 | Lee .................... G06F 11/0727 |
| 2023/0071289 | A1 | 3/2023 | Na et al. |
| 2023/0096408 | A1 | 3/2023 | Na et al. |
| 2024/0192852 | A1 | 6/2024 | Na et al. |

* cited by examiner

HOST DEVICE, STORAGE DEVICE AND OPERATING METHOD OF THE STORAGE DEVICE

CROSS-REFERENCE TO RELATED APPLICATION

This application claims priority from Korean Patent Application No. 10-2024-0048314 filed on Apr. 9, 2024 in the Korean Intellectual Property Office and all the benefits accruing therefrom under 35 U.S.C. 119, the disclosure of which is herein incorporated by reference in its entirety.

BACKGROUND

1. Field

One or more example embodiments of the disclosure relate to a host device, a storage device, and an operating method of the storage device.

2. Description of Related Art

A host device may monitor a state of a memory device by periodically reading internal data stored in the memory device. In this case, the read data is extracted in the form of a binary, and data configuration information of a corresponding memory device is required to parse the extracted data. To this end, the host device may store parsing information for each memory device. As the parsing information is updated, periodic management of the parsing information stored in each host device is required.

SUMMARY

One or more example embodiments of the disclosure provide a host device with improved efficiency and reliability.

One or more example embodiments of the disclosure provide a storage device with improved efficiency and reliability.

One or more example embodiments of the disclosure an operating method of a storage device with improved efficiency and reliability.

The objects of the disclosure are not limited to those mentioned above and additional objects of the disclosure, which are not mentioned herein, will be clearly understood by those skilled in the art from the following description of the disclosure.

According to an aspect of an example embodiment of the disclosure, there is provided a host device including a controller configured to process log data related to a state of a first storage device by using first spec data, the first spec data including parsing information for each log page identifier; and a communication circuit configured to transmit and receive data to and from the first storage device, wherein the controller is further configured to: transmit a first request for requesting the first spec data to the first storage device through the communication circuit; receive the first spec data from the first storage device through the communication circuit in response to the first request; transmit a second request for requesting first log data to the first storage device through the communication circuit; and receive the first log data from the first storage device through the communication circuit in response to the second request and process the received first log data by using the first spec data provided from the first storage device.

According to an aspect of an example embodiment of the disclosure, there is provided a storage device including: a memory configured to store log data and spec data for parsing the log data, wherein the spec data includes parsing information for each log page identifier; a communication circuit configured to communicate with a host device; and a controller configured to receive a first request for requesting the spec data from the host device through the communication circuit, and provide the spec data to the host device through the communication circuit in response to the first request.

According to an aspect of an example embodiment of the disclosure, there is provided an operating method of a storage device, the operating method including: receiving a first request for requesting spec data from a host device through a communication circuit; providing the spec data to the host device through the communication circuit in response to the first request; receiving a second request for requesting log data corresponding to a log page identifier from the host device through the communication circuit; and providing the log data generated by encoding a context of the storage device to the host device through the communication circuit in response to the second request, wherein the spec data includes parsing information for each log page identifier, and is used to process the log data in the host device.

BRIEF DESCRIPTION OF DRAWINGS

The above and other objects and features of the disclosure will become apparent by describing in detail example embodiments thereof with reference to the accompanying drawings.

DETAILED DESCRIPTION

Hereinafter, example embodiments will be described with reference to the accompanying drawings. It will be understood that, although the terms "first", "second", etc. may be used herein to describe various elements or components, these elements or components should not be limited by these terms. These terms are only used to distinguish one element or component from another element or component. Therefore, a first element or component discussed below could be termed a second element or component without departing from the technical spirits of the disclosure. As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

Hereinafter, a semiconductor device according to one or more example embodiments of the disclosure will be described with reference to FIGS. 1 to 9.

Figure 1:
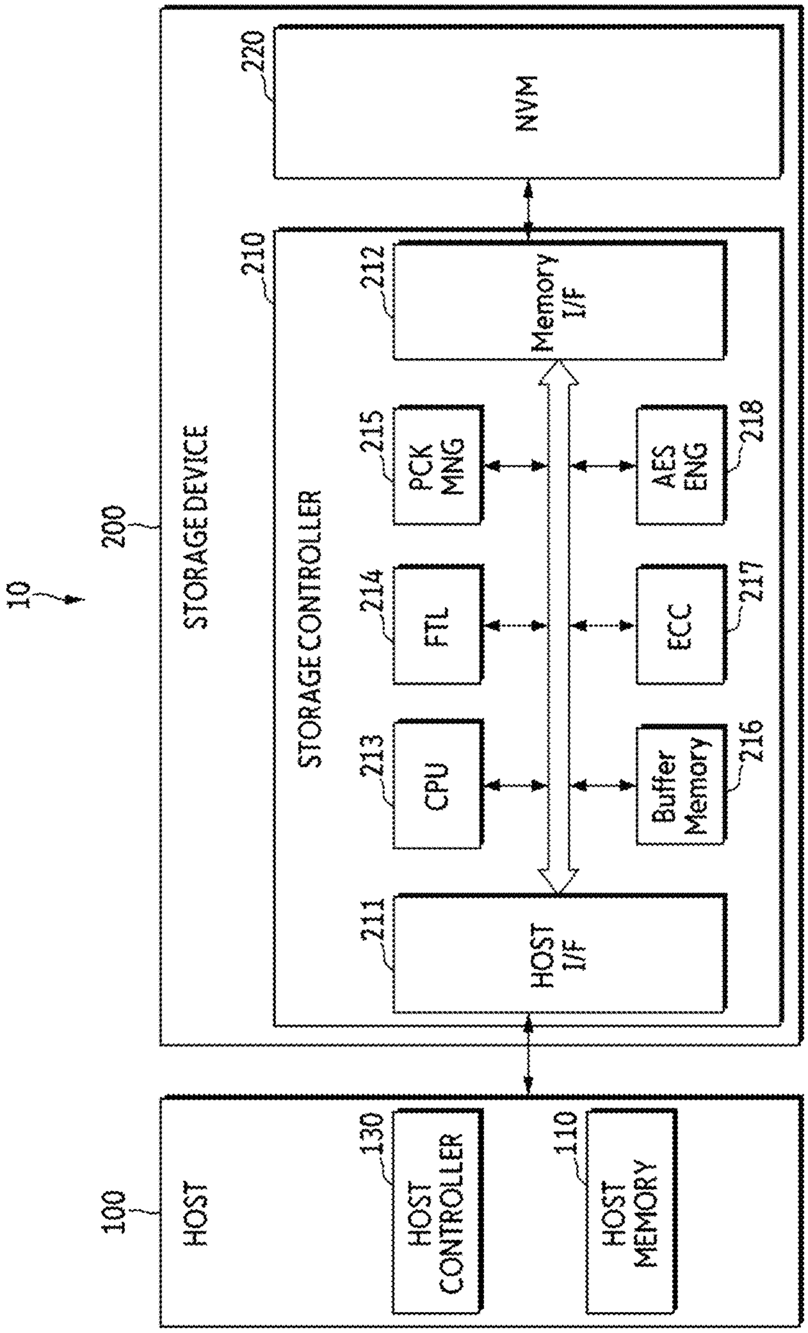
FIG. 1 is a block diagram illustrating a host-storage system according to one or more example embodiments.

FIG. 1 is a block diagram illustrating a host-storage system according to one or more example embodiments.

Referring to FIG. 1, a host-storage system 10 may include a host 100 and a storage device 200. Also, the storage device 200 may include a storage controller 210 and a non-volatile memory (NVM) 220. Also, in accordance with an example embodiment of the disclosure, the host 100 may include a host controller 130 and a host memory 110. The host memory 110 may serve as a buffer memory for temporarily storing data to be transmitted to the storage device 200 and/or data transmitted from the storage device 200.

The storage device 200 may include a storage medium for storing data in accordance with a request from the host 100. As an example, the storage device 200 may include at least one of a solid state drive (SSD), an embedded memory, and a detachable external memory. When the storage device 200 is the SSD, the storage device 200 may be a device that complies with the standard of a non-volatile memory express (NVMe), a non-volatile memory express management interface (NVMe-MI) or a non-volatile memory express over fabrics (NVMeof). When the storage device 200 is the embedded memory or the external memory, the storage device 200 may be a device that complies with the standard of a universal flash storage (UFS) or an embedded multi-media card (eMMC). Each of the host 100 and the storage device 200 may generate and transmit packets according to a standard protocol that is employed.

When the non-volatile memory 220 of the storage device 200 includes a flash memory, the flash memory may include a 2D NAND memory array or a 3D (or vertical) NAND (VNAND) memory array. As another example, the storage device 200 may include other various types of non-volatile memories. For example, a magnetic random access memory (MRAM), a spin-transfer torque MRAM, a Conductive Bridging RAM (CBRAM), a Ferroelectric RAM (FeRAM), a Phase RAM (PRAM), a Resistive RAM and other various types of memories may be applied to the storage device 200.

In accordance with some embodiments, each of the host controller 130 and the host memory 110 may be implemented as a separate semiconductor chip. Alternatively, in some embodiments, the host controller 130 and the host memory 110 may be integrated into the same semiconductor chip. As an example, the host controller 130 may include any of a plurality of modules provided in an application processor, and the application processor may be implemented as a system on chip (SoC). In addition, the host memory 110 may be an embedded memory provided in the application processor, or may be a non-volatile memory or memory module disposed outside the application processor.

The host controller 130 may store data (e.g., write data) of the host memory 110 in the non-volatile memory 220, and/or may manage an operation of storing data (e.g., read data) of the non-volatile memory 220 in a buffer region.

The storage controller 210 may include a host interface 211, a memory interface 212 and a central processing unit (CPU) 213. The storage controller 210 may further include a flash translation layer (FTL) 214, a package manger 215, a buffer memory 216, an error correction code (ECC) engine 217 and an advanced encryption standard (AES) engine 218. The storage controller 210 may further include a working memory (not shown) in which the flash translation layer (FTL) 214 is loaded, and the CPU 211 may control data write and read operations for the non-volatile memory 220 by executing the flash translation layer 214.

The host interface 211 may transmit and receive packets to and from the host 100. The packets transmitted from the host 100 to the host interface 211 may include a command and/or data to be written in the non-volatile memory 220, and the packets transmitted from the host interface 211 to the host 100 may include a response to the command and/or data read from the non-volatile memory 220. The memory interface 212 may transmit the data to be written in the non-volatile memory 220 to the non-volatile memory 220 and/or may receive the data read from the non-volatile memory 220. The memory interface 212 may be implemented to comply with standard protocols such as Toggle or Open NAND Flash Interface (ONFI).

The flash translation layer (FTL) 214 may perform various functions such as address mapping, wear-leveling and garbage collection. The address mapping operation is an operation of changing a logical address received from the host 100 to a physical address that is used to actually store data in the non-volatile memory 220. The wear-leveling is a technique for preventing excessive degradation of a specific block by allowing blocks in the non-volatile memory 220 to be used uniformly, and may be implemented through, for example, firmware technology for balancing erase counts of physical blocks. The garbage collection is a technique for securing an available capacity in the non-volatile memory 220 by copying valid data of a block to a new block and then erasing the existing block.

The packet manger 215 may generate packets according to a protocol of an interface negotiated with the host 100 and/or parse various kinds of information from the packets received from the host 100. Also, the buffer memory 216 may temporarily store data to be written in the nonvolatile memory 220 and/or data to be read from the nonvolatile memory 220. The buffer memory 216 may be provided in the storage controller 210, but may be disposed outside the storage controller 210.

The ECC engine 217 may perform error detection and correction functions for data read from the nonvolatile memory 220. In more detail, the ECC engine 217 may generate parity bits for write data to be written in the nonvolatile memory 200, and the generated parity bits may be stored in the nonvolatile memory 220 together with the write data. When reading the data from the nonvolatile memory 220, the ECC engine 217 may correct an error of the read data by using the parity bits read from the non-volatile memory 220 together with the read data, and then may output the error-corrected read data.

The AES engine 218 may perform at least one of an encryption operation and a decryption operation for the data input to the storage controller 200 by using a symmetric-key algorithm.

Figure 2:
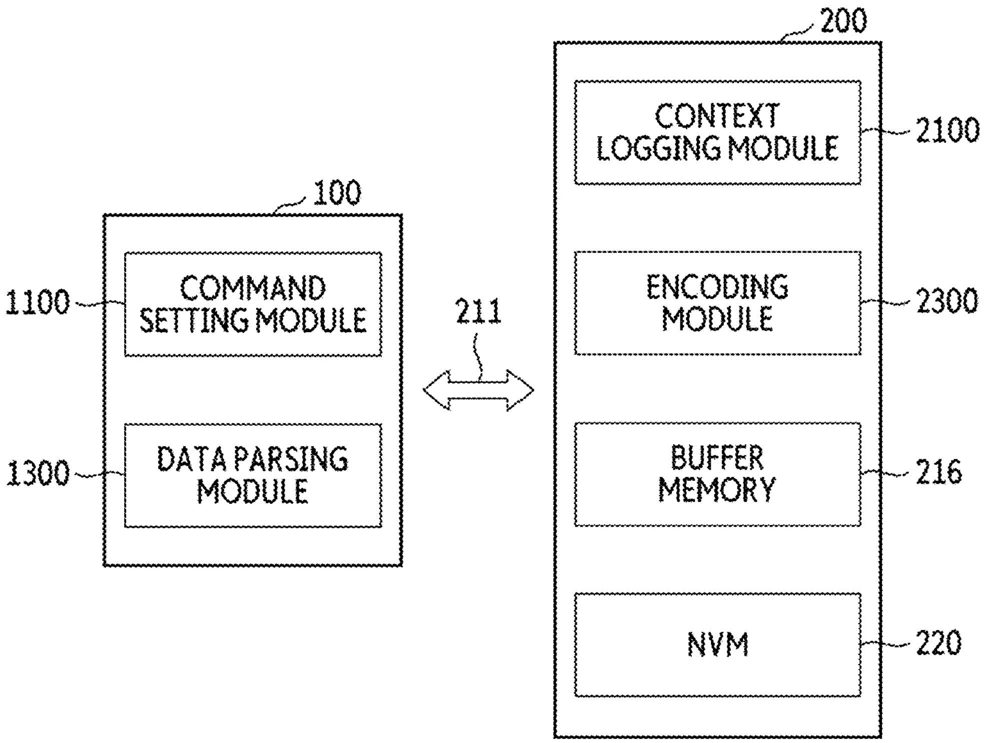
FIG. 2 is a block diagram conceptually illustrating the host-storage system of FIG. 1.

FIG. 2 is a schematic block diagram conceptually illustrating the host-storage system of FIG. 1.

Referring to FIGS. 1 and 2, the host-storage system 10 may include a host device 100 and a storage device 200.

The host device 100 may include a command setting module 1100 and a data parsing module 1300.

Each module described below may be stored in the host memory 110 or the nonvolatile memory 220 in a form of software and then executed by a processor (e.g., the CPU 213 of FIG. 1) in the host controller 130 or the storage controller 210, but the embodiment of the disclosure is not limited thereto. Each module may be implemented as hardware or both hardware and software in the host device 100 or the storage device 200. For example, each module may be implemented as custom hardware, a processor executing instructions from a memory, or any combination thereof.

The command setting module 1100 may be implemented as software in the host device 100, but the embodiment of the disclosure is not limited thereto. For example, the command setting module 1100 may be implemented as hardware or both hardware and software in the host device 100.

In some embodiments, the command setting module 1100 may form a format of a command to be transmitted to the storage device 200. A command (or request) provided by the host device 100 may be a command defined in the standard of NVMe, NVMe-MI or NVMeof.

For example, the command setting module 1100 may acquire spec data from the storage device 200 by transmitting a command for requesting the spec data from the storage device 200. The spec data may be data required to interpret log data in a form of human-readable data. For example, the log data may be telemetry data, but the embodiment of the disclosure is not limited thereto.

For example, the spec data may include a name of the storage device 200, a Log Page Identifier (LID) supported by the storage device and parsing information for each LID, but the embodiment of the disclosure is not limited thereto.

For example, the command setting module 1100 may acquire the log data from the storage device 200 by transmitting the command for requesting the log data from the storage device 200. The log data may be data representing state information of the storage device 200 in a form of a binary code. A detailed description of the spec data and the log data will be given below with reference to the following drawings.

The data parsing module 1300 may be implemented as software in the host device 100, but the embodiment of the disclosure is not limited thereto. For example, the data parsing module 1300 may be implemented as hardware or both hardware and software in the host device 100.

In some embodiments, the data parsing module 1300 may acquire state information of the storage device 200 in the form of human-readable data based on the spec data and the log data, which are received from the storage device 200.

As the form of human-readable data is acquired, a user may easily read a context of the storage device 200. In addition, as the state information of the storage device 200 is analyzed, whether performance of the storage device 200 is deteriorated and/or whether performance requirements set by the user are satisfied may be analyzed.

The storage device 200 may include a context logging module 2100, an encoding module 2300, a buffer memory 216 and a nonvolatile memory 220.

The context logging module 2100 may be implemented as software in the storage device 200, but the embodiment of the disclosure is not limited thereto. For example, the context logging module 2100 may be implemented as hardware or both hardware and software in the storage device 200.

In some embodiments, the context logging module 2100 may verify a corresponding context by using information (e.g., LID) included in the log data request command transmitted from the host device 100, and may take a snapshot of the context. The log data request command may include a log page identifier (LID). The LID may correspond to information indicating an identifier of a log page to be searched. A detailed description related to this will be given below with reference to the following drawings.

The encoding module 2300 may be implemented as software in the storage device 200, but the embodiment of the disclosure is not limited thereto. For example, the encoding module 2300 may be implemented as hardware or both hardware and software in the storage device 200.

In some embodiments, the encoding module 2300 may generate log data in which a context is encoded into binary data. A detailed description related to this will be given below with reference to the following drawings.

The buffer memory 216 may store the log data. The log data stored in the buffer memory 216 may be transmitted to the host device 100 through the host interface 211.

The nonvolatile memory 220 may store the spec data for the storage device 200. The stored spec data may be stored in the buffer memory 216 through the memory interface (e.g., 212 of FIG. 1) and transmitted to the host device 100 through the host interface 211.

Figure 3:
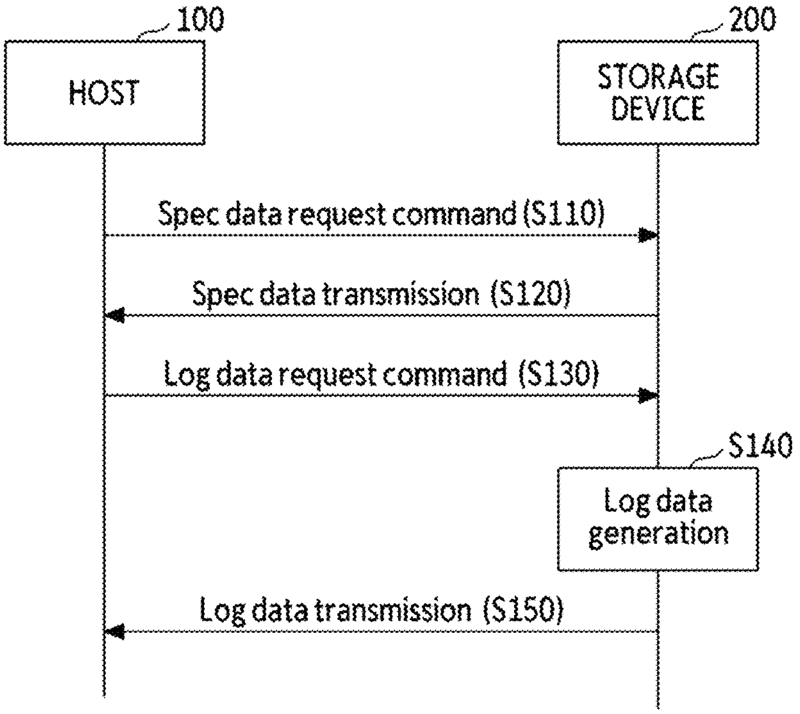
FIG. 3 is a flow chart illustrating an operating method of a host-storage system according to one or more example embodiments.
Figure 4:
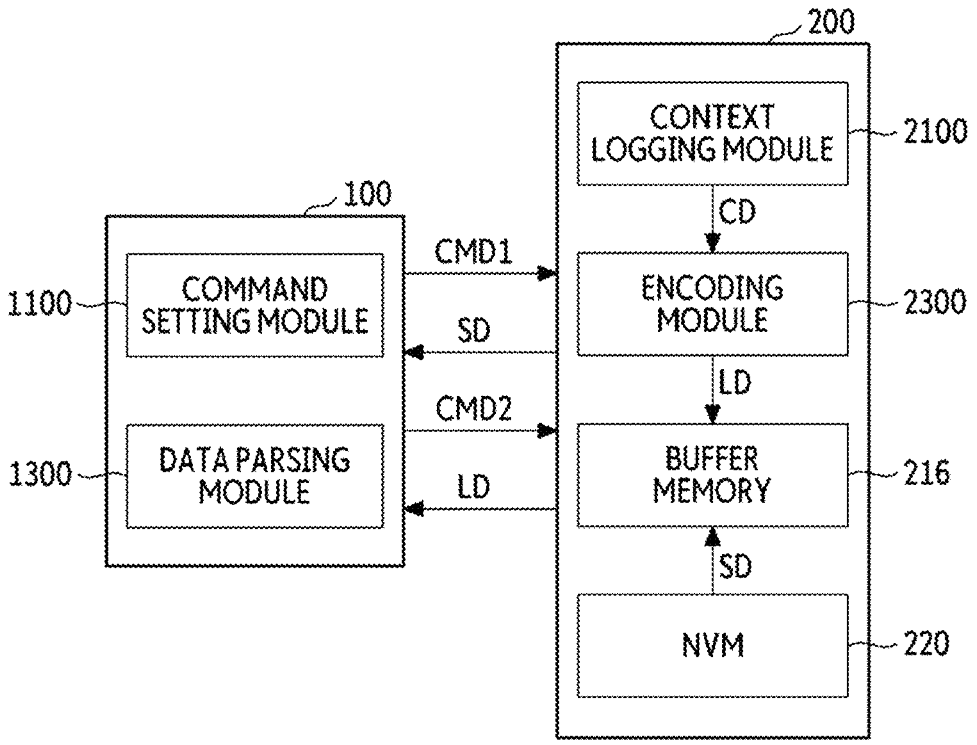
FIG. 4 is a block diagram illustrating an operating method of the host-storage system shown in FIG. 3.

FIG. 3 is a flow chart illustrating an operating method of a host-storage system according to one or more example embodiments. FIG. 4 is a block diagram illustrating an operating method of the host-storage system shown in FIG. 3.

Referring to FIGS. 3 and 4, the host device 100 transmits a spec data request command CMD1 to the storage device 200 (S110).

The command setting module 1100 may form a format of a command to be transmitted to the storage device 200. The command (or request) provided by the host device 100 may be a command defined in the standard of NVMe, NVMe-MI or NVMeof.

For example, the command setting module 1100 may acquire spec data SD from the storage device 200 by transmitting the spec data request command CMD1 to the storage device 200.

The storage device 200 may transmit the spec data to the host device 100 in response to the spec data request command CMD1 (S120).

In some embodiments, the spec data SD may be stored in the nonvolatile memory 220 of the storage device 200. The spec data SD stored in the nonvolatile memory 220 may be stored in the buffer memory 216 and then transmitted to the host device 100. The spec data SD may be data used to transform log data LD, which will be described later, into human-readable data.

The spec data SD may include a name of the storage device 200, a log page identifier (LID) supported by the storage device 200, and parsing information for each LID, but the embodiment of the disclosure is not limited thereto.

For example, the parsing information for each LID may include parsing information for each log data. For example, the parsing information for each LID may include a start offset and an end offset for each log data, but the embodiment of the disclosure is not limited thereto. The parsing information for each LID may be provided differently for each product and/or each customer company.

Also, the spec data SD may be different for each product, each product generation, and/or each customer company of the storage device 200. For example, different LIDs may be supported depending on each product and each customer company, and/or different items may be supported even in case of the same LID.

Therefore, when the spec data SD for the same storage device 200 is updated, the storage device 20 may be changed to a new storage device 200 or the generation of the storage device 200 may be changed, and thus, it may be difficult for the host device 100 to continuously manage the spec data SD.

In case of the host-storage system 10 according to one or more example embodiments of the disclosure, the spec data SD for the storage device 200 may be stored in the storage device 200, and the storage device 200 may transmit the spec data SD whenever the host device 100 requests the spec data SD. Therefore, even if the spec data SD is updated, the host device 100 is not required to continuously manage the spec data SD, and the host-storage system 10 with improved efficiency may be provided.

Next, the host device 100 may transmit a log data request command CMD2 to the storage device 200 (S130). While it is described in this embodiment that the log data request command CMD2 is transmitted subsequent to the spec data request command CMD1, the disclosure is not limited thereto, and in some embodiments, wherein the spec data request command CMD1 and the log data request command CMD2 may be simultaneously transmitted.

The command setting module 1100 may form a format of a command to be transmitted to the storage device 200. The command (or request) provided by the host device 100 may be a command defined in the standard of NVMe, NVMe-MI or NVMeof.

For example, the command setting module 1100 may acquire the log data LD from the storage device 200 by transmitting the log data request command CMD2 to the storage device 200.

In some embodiments, the log data request command CMD2 may include LID. Therefore, the log data LD corresponding to the LID may be selectively acquired.

The storage device 200 may generate log data in accordance with the log data request command CMD2 (S140).

In some embodiments, the context logging module 2100 may take a snapshot of the context CD of the storage device 200 at the time when the log data request command CMD2 is transmitted. Also, the context logging module 2100 may identify the corresponding context CD by using information (e.g., LID) included in the log data request command transmitted from the host device 100, and may take a snapshot of the identified context CD.

The context CD subjected to the snapshot (that is, of which the snapshot has been taken) may be transmitted from the context logging module 2100 to the encoding module 2300.

In some embodiments, the encoding module 2300 may generate log data LD in which a context is encoded into binary data. The log data LD may be data representing state information of the storage device 200 in the form of a binary code.

The log data LD may be transmitted from the encoding module 2300 to the buffer memory 216.

The storage device 200 may transmit the log data LD to the host device 100 (S150).

The log data LD stored in the buffer memory 216 may be transmitted to the host device 100 through the host interface 211.

The data parsing module 1300 may monitor the state of the storage device 200 by using the spec data SD and the log data LD, which are transmitted to the host device 100. A detailed description related to this will be given later.

Figure 5:
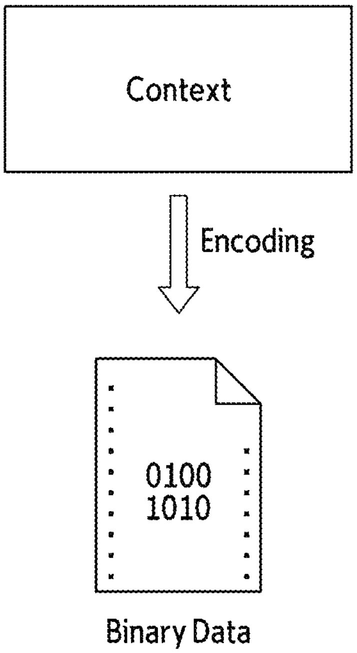
FIG. 5 is a view illustrating an operation of an encoding module of FIG. 4.

FIG. 5 is a view illustrating an operation of the encoding module of FIG. 4.

Referring to FIG. 5, the encoding module 2300 may encode the context transmitted from the context logging module 2100 into log data that is binary data.

Since the context is transformed into log data that is binary data and transmitted to the host device 100, the host device 100 may parse the log data into human-readable data to use the log data. The operation of parsing log data will be described below.

Figure 6:
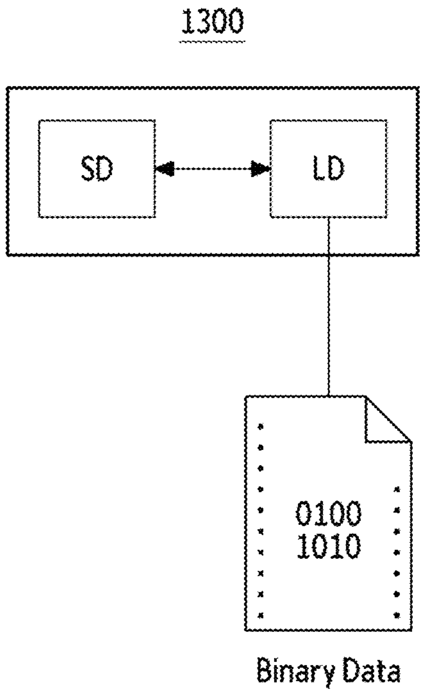
FIG. 6 is a view illustrating an operation of a data parsing module of FIG. 4.

FIG. 6 is a view illustrating an operation of the data parsing module of FIG. 4.

Referring to FIG. 6, the data parsing module 1300 may load the spec data SD and the log data LD, which are received from the storage device 200. The log data LD may be data representing the state information of the storage device 200 in the form of a binary code.

The spec data SD may be data used to transform the log data LD in the form of a binary code into data in the form of a human-readable data.

The spec data SD that may be different for each product of the storage device 200 may be stored in the storage device 200, and the storage device 200 may transmit the spec data SD whenever the host device 100 requests the spec data. Therefore, even if the spec data SD is updated, the host device 100 is not required to continuously manage the spec data SD, and the host-storage system 10 with improved efficiency may be provided.

Figure 7:
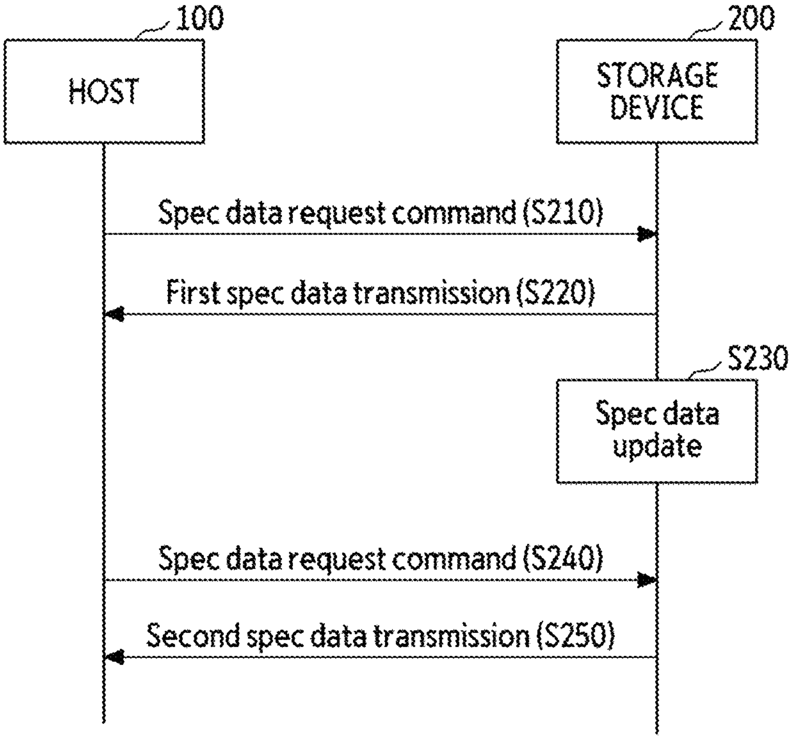
FIGS. 7 and 8 are flow charts illustrating an operating method of a host-storage system according to one or more example embodiments.
Figure 8:
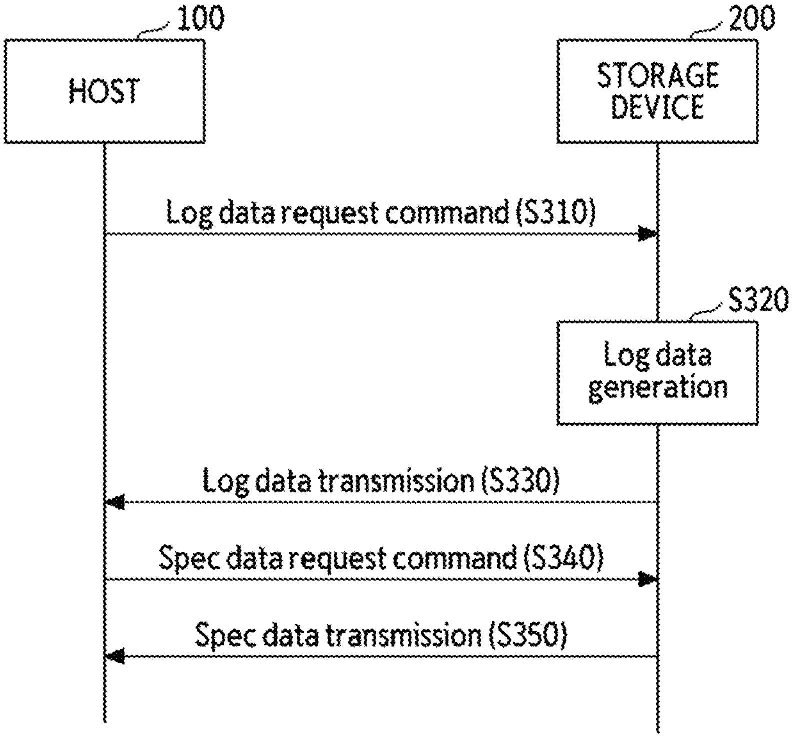

FIGS. 7 and 8 are flow charts illustrating an operating method of a host-storage system according to one or more example embodiments.

Referring to FIG. 7, the host device 100 may transmit a spec data request command CMD1 to the storage device 200 (S210).

The transmission of the spec data request command CMD1 to the storage device 200 by the host device 100 may be the same or similar to that described with reference to FIG. 3, and thus, its description will be omitted.

The storage device 200 may transmit first spec data to the host device 100 (S220).

The first spec data may be similar to the spec data described with reference to FIG. 3, and thus, its description will be omitted.

After the first spec data is transmitted, the spec data in the storage device 200 may be updated (S230).

The update of the spec data may refer to a concept that includes any of a change in the product of the storage device 200, a change in the generation of the storage device 200, an internal update of the storage device 200, etc.

For example, the first spec data may be changed to second spec data in accordance with the update.

Afterwards, the host device 100 may transmit a spec data request command CMD1-2 to the storage device 200 (S240).

The transmission of the spec data request command CMD1-2 to the storage device 200 by the host device 100 may be the same or similar to the transmission of the spec data request command CMD1 described with reference to FIG. 3, and thus, its description will be omitted.

The storage device 200 may transmit the second spec data to the host device 100 (S250).

The second spec data may be similar to the spec data described with reference to FIG. 3, and thus, its description will be omitted.

In case of the host-storage system 10 according to one or more example embodiments of the disclosure, the spec data SD for a corresponding storage device 200 may be stored in the storage device 200, and the storage device 200 may transmit the spec data SD whenever the host device 100 requests the spec data SD from the storage device 200. Therefore, even if the spec data SD is updated, the host device 100 may not be required to continuously manage the spec data SD, and the host-storage system 10 with improved efficiency may be provided.

Afterwards, although not shown in the drawing, the host device 100 may transmit a log data request command to the storage device 200 and receive log data from the storage device 200 based on the log data request command.

Referring to FIGS. 4 and 8, the host device 100 may transmit the log data request command CMD2 to the storage device 200 (S310).

The command setting module 1100 of the host device 100 may form a format of a command to be transmitted to the storage device 200. The command (or request) provided by the host device 100 may be a command defined in the standard of NVMe, NVMe-MI or NVMeof.

For example, the command setting module 1100 may acquire the log data LD from the storage device 200 by transmitting the log data request command CMD2 to the storage device 200.

In some embodiments, the log data request command CMD2 may include a LID. Therefore, the log data LD corresponding to the LID may be selectively acquired based on the log data request command CMD2.

The storage device 200 may generate the log data in accordance with the log data request command CMD2 (S320).

In some embodiments, the context logging module 2100 may take a snapshot of the context CD of the storage device 200 at the time when the log data request command CMD2 is transmitted. Also, the context logging module 2100 may identify the corresponding context CD by using information (e.g., LID) included in the log data request command CMD2 transmitted from the host device 100, and may take a snapshot of the identified context CD.

The context CD subjected to the snapshot (that is, of which the snapshot has been taken) may be transmitted from the context logging module 2100 to the encoding module 2300.

In some embodiments, the encoding module 2300 may generate log data LD in which a context is encoded into binary data. The log data LD may be data representing state information of the storage device 200 in the form of a binary code.

The log data LD may be transmitted from the encoding module 2300 to the buffer memory 216.

The storage device 200 transmits the log data LD to the host device 100 (S330).

The log data LD stored in the buffer memory 216 may be transmitted to the host device 100 through the host interface 211.

The host device 100 may transmit the spec data request command CMD1 to the storage device 200 (S340).

The command setting module 1100 of the host device 100 may form a format of a command to be transmitted to the storage device 200. The command (or request) provided by the host device 100 may be a command defined in the standard of NVMe, NVMe-MI or NVMeof.

For example, the command setting module 1100 may acquire the spec data SD from the storage device 200 by transmitting the spec data request command CMD1 to the storage device 200.

The storage device 200 may transmit the spec data SD to the host device 100 (S350).

In some embodiments, the spec data SD may be stored in the nonvolatile memory 220 of the storage device 200. The spec data SD stored in the nonvolatile memory 220 may be stored in the buffer memory 216 and then transmitted to the host device 100. The spec data SD may be data used to transform log data LD, which will be described later, into human-readable data.

The spec data SD may be different for each product, each product generation, and/or each customer company of the storage device 200. For example, different LIDs may be supported for each product and each customer company, or different items may be supported even in case of the same LID.

Therefore, when the spec data SD for the same storage device 200 is updated, the storage device 20 is changed to a new storage device 200, or the generation of the storage device 200 is changed, it may be difficult for the host device 100 to continuously manage the spec data SD.

However, in case of the host-storage system 10 according to one or more example embodiments of the disclosure, the spec data SD for the storage device 200 may be stored in the storage device 200, and the storage device 200 may transmit the spec data SD whenever the host device 100 requests the spec data SD. Therefore, even if the spec data SD is updated, the host device 100 may not be required to continuously manage the spec data SD, and the host-storage system 10 with improved efficiency may be provided.

Figure 9:
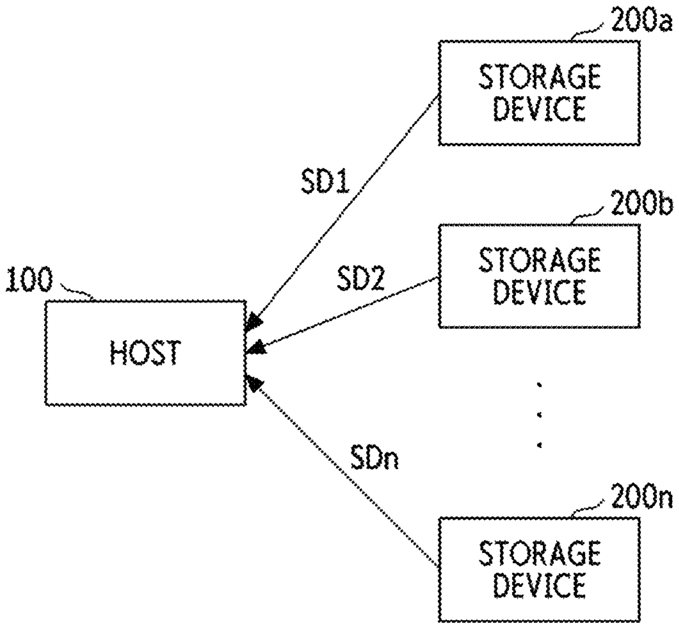
FIG. 9 is a view illustrating a host-storage system according to one or more example embodiments.

FIG. 9 is a view illustrating a host-storage system according to one or more example embodiments.

Referring to FIG. 9, in some embodiments, a host-storage system in which the host device 100 is connected to a plurality of storage devices 200 may be provided.

Each of storage devices 200*a*, 200*b* and 200*n* included in the plurality of storage devices 200 may have the same description as the storage device 200 described with reference to FIGS. 1 to 8.

In some embodiments, when the host device 100 transmits a spec data request command to the first storage device 200*a*, the first storage device 200 may transmit the first spec data SD1 to the host device 100.

When the host device 100 transmits a spec data request command to the second storage device 200*b*, the second storage device 200 may transmit the second spec data SD2 to the host device 100.

Likewise, when the host device 100 transmits a spec data request command to the (n)th storage device 200*n*, the (n)th storage device 200 may transmit the (n)th spec data SD to the host device 100.

As described above, the spec data SD may be different for each product, each product generation, and/or each customer company of the storage device 200. For example, different LIDs may be supported for each product and each customer company, or different items may be supported even in case of the same LID.

Therefore, when the spec data SD for the same storage device 200 is updated, the storage device 20 is changed to a new storage device 200, or the generation of the storage device 200 is changed, it may be difficult for the host device 100 to continuously manage the spec data SD.

However, in case of the host-storage system 10 according to one or more example embodiments of the disclosure, the spec data SD for the storage device 200 may be stored in the storage device 200, and the storage device 200 may transmit the spec data SD whenever the host device 100 requests the spec data SD. Therefore, even if the spec data SD is updated, the host device 100 may not be required to continuously manage the spec data SD, and the host-storage system 10 with improved efficiency may be provided.

At least one of the components, elements, modules and units (collectively "components" in this paragraph) represented by a block or an equivalent indication in the drawings as described above may use a direct circuit structure, such as a memory, a processor, a logic circuit, a look-up table, etc. that may execute the respective functions through controls of one or more microprocessors or other control apparatuses. Alternatively or additionally, at least one of these components may be specifically embodied by a module, a program, or a part of code, which is stored in an internal memory of the host 100 and the storage device 200 or an external memory, and contains one or more executable instructions for performing the above-described functions, and executed by one or more microprocessors or other controller included in the host 100 and the storage device 200. Further, at least one of these components may include or may be implemented by a processor such as a central processing unit (CPU), graphic processing unit (GPU), another type of microprocessor, or the like in the host 100 and the storage device 200 that performs the above-described functions. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors.

Although the example embodiments according to the technical spirits of the disclosure have been described with reference to the accompanying drawings, it will be apparent to those skilled in the art that the disclosure can be implemented in various forms without being limited to the above-described embodiments and may be embodied in other specific forms without departing from technical spirits and essential characteristics of the disclosure. Thus, the above embodiments are to be considered in all respects as illustrative and not restrictive.

What is claimed is:

1. A host device comprising:

a controller configured to process log data related to a state of a first storage device by using first spec data, the first spec data including parsing information for each log page identifier; and a communication circuit configured to transmit and receive data to and from the first storage device, wherein the controller is further configured to:

transmit a first request for requesting the first spec data to the first storage device through the communication circuit;

receive the first spec data from the first storage device through the communication circuit in response to the first request;

transmit a second request for requesting first log data to the first storage device through the communication circuit; and receive the first log data from the first storage device through the communication circuit in response to the second request and process the received first log data by using the first spec data provided from the first storage device.

2. The host device of claim 1, wherein the first log data is based on encoding of a context of the first storage device.

3. The host device of claim 2, wherein the second request includes a log page identifier, and wherein the first log data received from the first storage device is generated based on encoding of the context at a time when the first storage device receives the second request.

4. The host device of claim 3, further comprising a memory, wherein the first log data is stored in the memory.

5. The host device of claim 1, wherein the controller is configured to simultaneously transmit the first request and the second.

6. The host device of claim 5, wherein the first spec data further comprises at least one of a name of the first storage device and a log page identifier supported by the first storage device.

7. The host device of claim 1, wherein the first log data comprises a binary code.

8. The host device of claim 7, wherein the controller is configured to, in processing the first log data by using the first spec data, parse the first log data into human-readable data.

9. The host device of claim 1, wherein the controller is configured to:

transmit a third request for requesting second spec data to a second storage device different from the first storage device through the communication circuit;

receive the second spec data from the second storage device through the communication circuit in response to the third request;

transmit a fourth request for requesting second log data to the second storage device through the communication circuit; and receive the second log data from the second storage device through the communication circuit in response to the fourth request and process the received second log data by using the second spec data provided from the second storage device.

10. The host device of claim 1, wherein the controller is further configured to, in response to the first spec data being updated after the first spec data is provided from the first storage device:

transmit a fifth request for requesting the updated first spec data to the first storage device through the communication circuit, and receive the updated first spec data from the first storage device through the communication circuit in response to the fifth request.

11. A storage device comprising:

a memory configured to store log data and spec data for parsing the log data, wherein the spec data includes parsing information for each log page identifier;

a communication circuit configured to communicate with a host device; and a controller configured to receive a first request for requesting the spec data from the host device through the communication circuit, and provide the spec data to the host device through the communication circuit in response to the first request.

12. The storage device of claim 11, wherein the controller is further configured to receive a second request for requesting the log data from the host device through the communication circuit, and provide the log data to the host device through the communication circuit in response to the second request.

13. The storage device of claim 12, wherein the second request comprises a log page identifier.

14. The storage device of claim 12, wherein the log data is binary data obtained by encoding a context of the storage device.

15. The storage device of claim 12, wherein the log data is generated by encoding a context at a time when the second request is received through the communication circuit.

16. The storage device of claim 11, wherein the spec data further comprises at least one of a name of the storage device and a log page identifier supported by the storage device.

17. The storage device of claim 11, wherein the controller is further configured to:

in response to the spec data being updated, store the updated spec data in the memory; and in response to receiving a third request for requesting the updated spec data from the host device through the communication circuit, provide the updated spec data to the host device through the communication circuit in response to the third request.

18. An operating method of a storage device, the operating method comprising:

receiving a first request for requesting spec data from a host device through a communication circuit;

providing the spec data to the host device through the communication circuit in response to the first request;

receiving a second request for requesting log data corresponding to a log page identifier from the host device through the communication circuit; and providing the log data generated by encoding a context of the storage device to the host device through the communication circuit in response to the second request, wherein the spec data includes parsing information for each log page identifier, and is used to process the log data in the host device.

19. The operating method of claim 18, further comprising generating the log data, which is binary data, by encoding the context at a time when the second request is received.

20. The operating method of claim 19, further comprising storing the log data in a memory.

* * * * *